(12) United States Patent
Cotoros

(10) Patent No.: US 10,534,963 B2
(45) Date of Patent: *Jan. 14, 2020

(54) SYSTEMS AND METHODS FOR IDENTIFYING VIDEO HIGHLIGHTS BASED ON AUDIO

(71) Applicant: GoPro, Inc., San Francisco, CA (US)

(72) Inventor: Ingrid A. Cotoros, Hillsborough, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,163

(22) Filed: Mar. 29, 2019

(65) Prior Publication Data

US 2019/0228229 A1 Jul. 25, 2019

Related U.S. Application Data

(63) Continuation of application No. 15/873,447, filed on Jan. 17, 2018, now Pat. No. 10,248,866.

(51) Int. Cl.
*G06K 9/00* (2006.01)
*H04N 5/232* (2006.01)

(52) U.S. Cl.
CPC ..... *G06K 9/00718* (2013.01); *H04N 5/23238* (2013.01); *G06K 2009/00738* (2013.01)

(58) Field of Classification Search
USPC .................................................. 386/239–248
See application file for complete search history.

(56) References Cited

U.S. PATENT DOCUMENTS

2016/0283185 A1 9/2016 McLaren

*Primary Examiner* — Hung Q Dang
(74) *Attorney, Agent, or Firm* — Esplin & Associates, PC

(57) ABSTRACT

Audio content may be captured during capture of spherical video content. An audio event within the audio content may indicate an occurrence of a highlight event based on sound(s) originating from audio source(s) captured within an audio event extent within the spherical video content at an audio event moment. Temporal type of the audio event providing guidance with respect to relative temporality of the highlight event with respect to the audio event and spatial type of the audio event providing guidance with respect to relative spatiality of the highlight event with respect to the audio event may be determined. A highlight event moment of the highlight event may be identified based on the audio event moment and temporal type of the audio event. A highlight event extent of the highlight event may be identified based on the audio event extent and the spatial type of the audio event.

20 Claims, 8 Drawing Sheets

SYSTEMS AND METHODS FOR IDENTIFYING VIDEO HIGHLIGHTS BASED ON AUDIO

FIELD

This disclosure relates to identifying video highlights based on relative temporality and relative spatiality of a highlight event with respect to an audio event.

BACKGROUND

Video may include capture of a highlight event. Audio may provide guidance with respect to where and when within the video the highlight event occurs.

SUMMARY

This disclosure relates to identifying video highlights based on audio. Video information, audio information, and/or other information may be obtained. The video information may define spherical video content having a progress length. The spherical video content may define visual content viewable from a point of view as a function of progress through the progress length of the spherical video content. The audio information may define audio content captured during capture of the spherical video content. The audio information may characterize one or more directions of sounds within the audio content. An audio event may be identified within the audio content. The audio event may indicate an occurrence of a highlight event based on one or more of the sounds within the audio content. The audio event may occur at an audio event moment within the progress length. The one or more of the sounds may originate from one or more audio sources captured within an audio event extent within the spherical video content at the audio event moment. The audio event extent may be characterized by an audio viewing direction and an audio viewing size.

A temporal type of the audio event and a spatial type of the audio event may be determined. The temporal type may provide guidance with respect to relative temporality of the highlight event with respect to the audio event. The spatial type may provide guidance with respect to relative spatiality of the highlight event with respect to the audio event. A highlight event moment of the highlight event may be identified based on the audio event moment, the temporal type of the audio event, and/or other information. The highlight event may occur at the highlight event moment within the progress length. A highlight event extent of the highlight event may be identified based on the audio event extent, the spatial type of the audio event, and/or other information. The highlight event extent may be characterized by a highlight viewing direction and a highlight viewing size. The highlight event may be captured within the highlight event extent within the spherical video content at the highlight event moment. The identification of the highlight event moment and the identification of the highlight event extent may be stored in one or more storage media.

A system that identifies video highlights based on audio may include one or more electronic storage, processor and/or other components. The electronic storage may store video information defining video content, audio information defining audio content, and/or other information. Video content may refer to media content that may be consumed as one or more videos. Video content may include one or more videos stored in one or more formats/containers, and/or other video content. The video content may have a progress length. The video content may define visual content viewable as a function of progress through the progress length of the video content. The video content may include spherical video content and/or other video content. Spherical video content may define visual content viewable from a point of view as a function of progress through the progress length of the spherical video content. In some implementations, the video content (e.g., spherical video content) may be consumed as virtual reality content.

Audio content may refer to media content that may be consumed as one or more sounds. Audio content may include one or more sounds stored in one or more formats/containers, and/or other audio content. The audio information may characterize one or more directions of the sound(s) within audio content. Audio content may include one or more spatial sounds. Audio content may be captured during capture of the video content (e.g., spherical video content). In some implementations, audio content may include audio portion of the video content. The audio information may be part of and/or associated/linked with the video information. For example, the video content and the audio content may be packaged together using a particular format/container. In some implementations, audio content may be separate from the video content. The audio information may be separate (e.g., stored separately from) the video information.

In some implementations, the video content may be captured by an image capture device and the audio content may be captured by an audio capture device of the image capture device. In some implementations, the video content may be captured by an image capture device and the audio content may be captured by an audio capture device separate from the image capture device.

The processor(s) may be configured by machine-readable instructions. Executing the machine-readable instructions may cause the processor(s) to facilitate identifying video highlights based on audio. The machine-readable instructions may include one or more computer program components. The computer program components may include one or more of a video information component, an audio information component, an audio event component, a temporal type component, a spatial type component, a highlight event moment component, a highlight event extent component, a storage component, and/or other computer program components. In some implementations, the computer program components may include a video summary component.

The video information component may be configured to obtain video information defining one or more video content (e.g., spherical video content) and/or other information. The video information component may obtain video information from one or more storage locations. The video information component may obtain video information during acquisition of the video content and/or after acquisition of the video content by one or more image sensors/image capture devices.

The audio information component may be configured to obtain audio information defining one or more audio content and/or other information. The audio information component may obtain audio information from one or more storage locations. The audio information component may obtain audio information during acquisition of the audio content and/or after acquisition of the audio content by one or more sound sensors.

The audio event component may be configured to identify one or more audio events within the audio content. An audio event may indicate an occurrence of a highlight event based on one or more of the sounds within the audio content and/or other information. In some implementations, the one or more of the sounds may include one or more particular terms, one or more particular combinations of terms, and/or other sounds. In some implementations, the one or more of the sounds may be of one or more particular intensities and/or one or more particular patterns.

An audio event may occur at an audio event moment within the progress length of the video content. The one or more of the sounds may originate from one or more audio sources captured within the video content. The audio source(s) may be captured within an audio event extent within the video content at the audio event moment. The audio event extent may be characterized by an audio viewing direction, an audio viewing size, and/or other information.

The temporal type component may be configured to determine a temporal type of the audio event. The temporal type may provide guidance with respect to relative temporality of the highlight event with respect to the audio event. The temporal type may indicate when the highlight event occurs with respect to when the audio event occurs. The temporal type may indicate whether the highlight event occurs before, during, and/or after the audio event.

The spatial type component may be configured to determine a spatial type of the audio event. The spatial type may provide guidance with respect to relative spatiality of the highlight event with respect to the audio event. The spatial type may indicate where the highlight event occurs with respect to where the audio event occurs. The spatial type may indicate whether the highlight event occurs co-located or not co-located with the audio event.

The highlight event moment component may be configured to identify a highlight event moment of the highlight event based on the audio event moment, the temporal type of the audio event, and/or other information. The highlight event may occur at the highlight event moment within the progress length of the video content.

The highlight event extent component may be configured to identify a highlight event extent of the highlight event based on the audio event extent, the spatial type of the audio event, and/or other information. The highlight event extent may be characterized by a highlight viewing direction, a highlight viewing size, and/or other information. The highlight event may be captured within the highlight event extent within the spherical video content at the highlight event moment.

For example, the spatial type may provide that the highlight event occurs co-located with the audio event, and the highlight event extent may be identified to be the same as the audio event extent. The spatial type may provide that the highlight event occurs co-located with the audio event, and the highlight event extent may be identified based on tracking an object within the audio event extent and/or other information.

The spatial type may provide that the highlight event does not occur co-located with the audio event, and the highlight event extent may be identified based on a relative location of the audio source(s) with respect to an image capture device that captured the video content (e.g., spherical video content), one or more directions of the one or more of the sounds originating from the audio source(s), and/or other information.

The spatial type may provide that the highlight event does not occur co-located with the audio event, and the highlight event extent may be identified based on a relative location of the audio source(s) with respect to an image capture device that captured the video content (e.g., spherical video content), a gaze analysis within the audio event extent, and/or other information.

The spatial type may provide that the highlight event does not occur co-located with the audio event, and the highlight event extent may be identified based on a relative location of the audio source(s) with respect to an image capture device that captured the video content (e.g., spherical video content), a gesture analysis within the audio event extent, and/or other information.

The storage component may be configured to effectuate storage of the identification of the highlight event moment, the identification of the highlight event extent, and/or other information in one or more storage media. The storage component may effectuate storage of the identification of the highlight event moment, the identification of the highlight event extent, and/or other information in one or more storage locations including the video information and/or the audio information and/or other storage locations.

The video summary component may be configured to generate one or more video summaries. A video summary may include one or more portions of the video content (e.g., spherical video content). The portion(s) of the video content may include the highlight event based on the highlight event moment, the highlight event extent, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
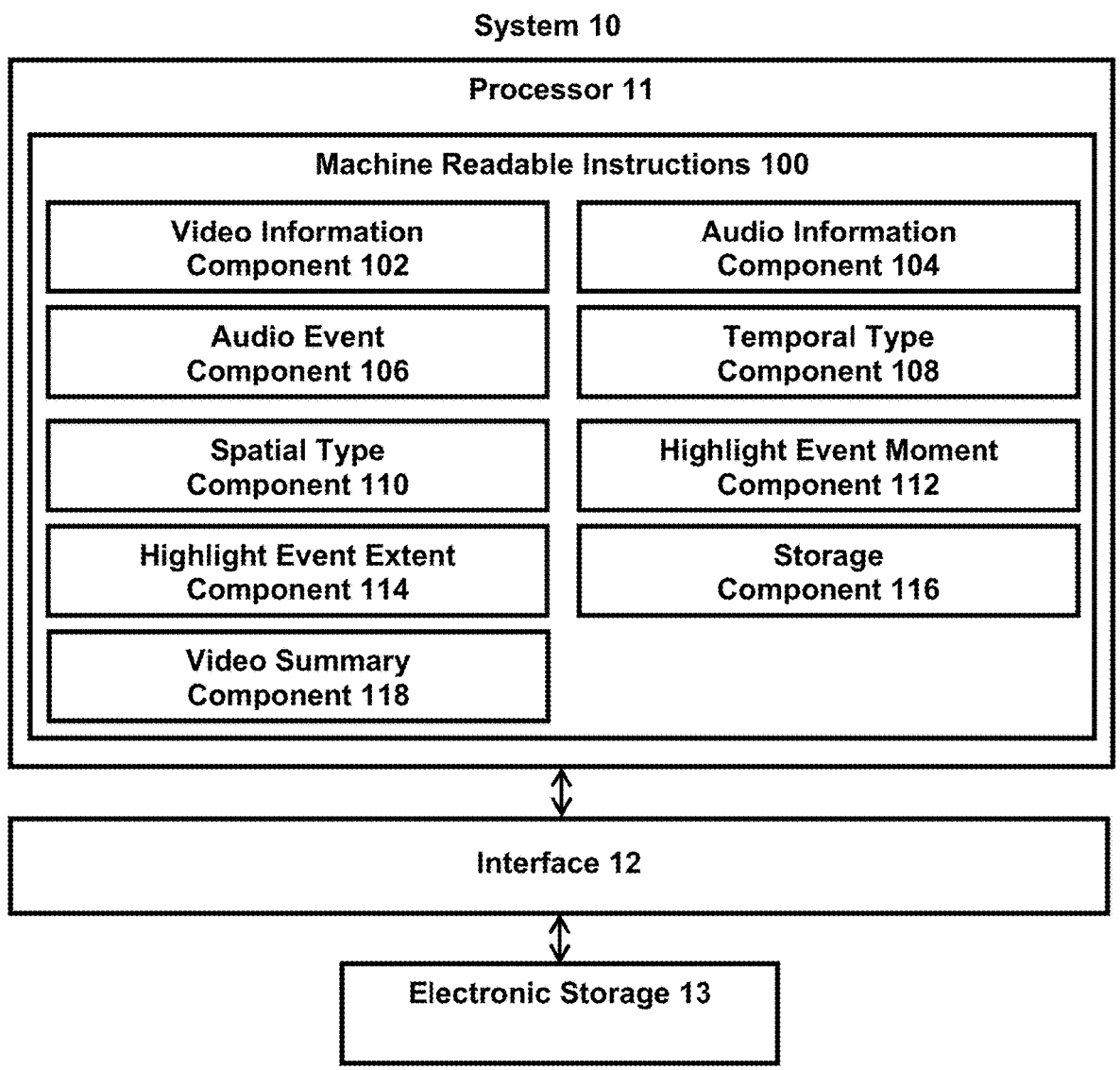
FIG. 1 illustrates a system that identifies video highlights based on audio.

FIG. 1 illustrates a system 10 for identifying video highlights based on audio. The system 10 may include one or more of a processor 11, an interface 12 (e.g., bus, wireless interface), an electronic storage 13, a display 14, and/or other components. Video information, audio information, and/or other information may be obtained by the processor 11. The video information may define spherical video content having a progress length. The spherical video content may define visual content viewable from a point of view as a function of progress through the progress length of the spherical video content. The audio information may define audio content captured during capture of the spherical video content. The audio information may characterize one or more directions of sounds within the audio content. An audio event may be identified within the audio content. The audio event may indicate an occurrence of a highlight event based on one or more of the sounds within the audio content. The audio event may occur at an audio event moment within the progress length. The sound(s) may originate from one or more audio sources captured within an audio event extent within the spherical video content at the audio event moment. The audio event extent may be characterized by an audio viewing direction and an audio viewing size.

A temporal type of the audio event and a spatial type of the audio event may be determined. The temporal type may provide guidance with respect to relative temporality of the highlight event with respect to the audio event. The spatial type may provide guidance with respect to relative spatiality of the highlight event with respect to the audio event. A highlight event moment of the highlight event may be identified based on the audio event moment, the temporal type of the audio event, and/or other information. The highlight event may occur at the highlight event moment within the progress length. A highlight event extent of the highlight event may be identified based on the audio event extent, the spatial type of the audio event, and/or other information. The highlight event extent may be characterized by a highlight viewing direction and a highlight viewing size. The highlight event may be captured within the highlight event extent within the spherical video content at the highlight event moment. The identification of the highlight event moment and the identification of the highlight event extent may be stored in one or more storage media.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, video content (e.g., spherical video content), audio information, audio content, audio events, highlight events, audio event extents, temporal types of audio events, spatial types of audio events, highlight event moments, highlight event extents, and/or other information.

For example, the electronic storage 13 may store video information defining video content, audio information defining audio content, and/or other information. Video content may refer to media content that may be consumed as one or more videos. Video content may include one or more videos stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by a video capture device, multiple video clips captured by a video capture device, and/or multiple video clips captured by different video capture devices. Video content may include multiple video clips captured at the same time and/or multiple video clips captured at different times. Video content may include a video clip processed by a video application, multiple video clips processed by a video application, and/or multiple video clips processed by different video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. For example, multiple images/videos captured by multiple cameras/image sensors may be stitched together to form the spherical video content. The field of view of cameras/image sensor(s) may be moved/rotated (e.g., via movement/rotation of optical element(s), such as lens, of the image sensor(s)) to capture multiple images/videos from a location, which may be stitched together to form the spherical video content. In some implementations, spherical video content may be stored with a 5.2K resolution. Using a 5.2K spherical video content may enable viewing windows for the spherical video content with resolution close to 1080 p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
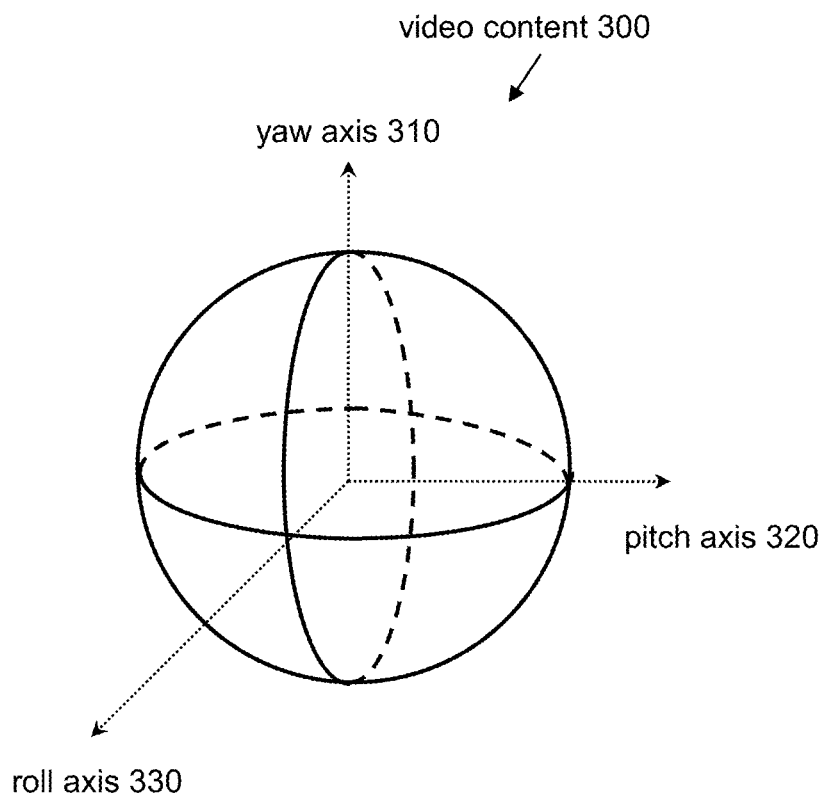
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the progress length of the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

A playback of video content (e.g., the video content 300) may include presentation of one or more portions of the video content on one or more displays based on a viewing window and/or other information. The viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by a viewing direction, viewing size (e.g., zoom), and/or other information. A viewing direction may define a direction of view for video content. A viewing direction may define the angle/visual portion of the video content at which the viewing window is directed. A viewing direction may define a direction of view for the video content selected by a user and/or defined by instructions for viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content is defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

Figure 4:
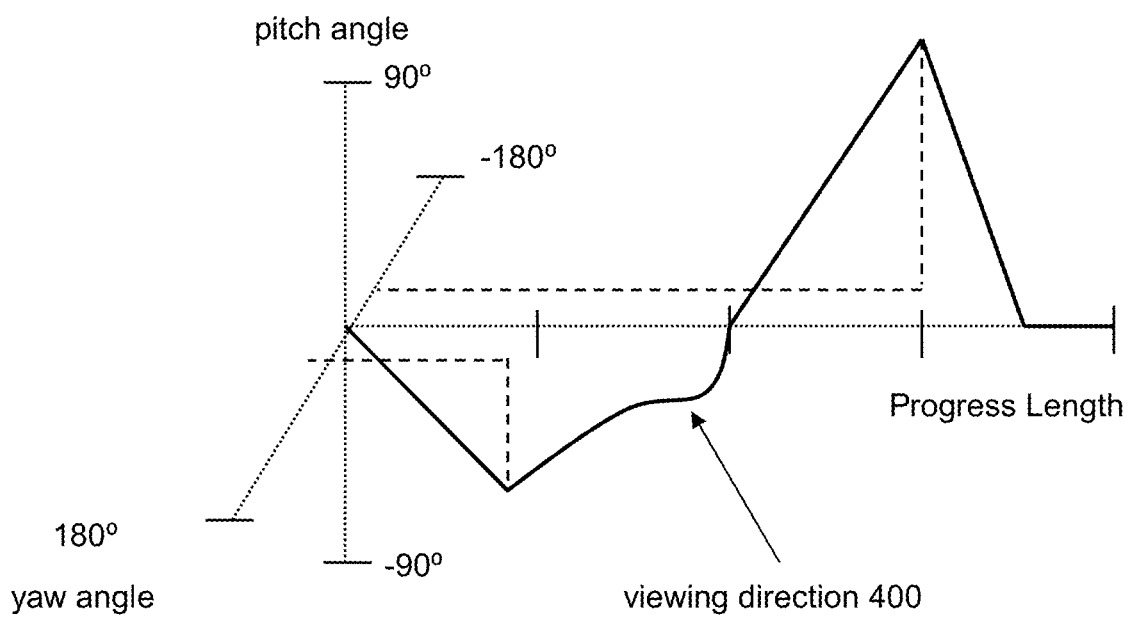
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

Figures 5A, 5B:
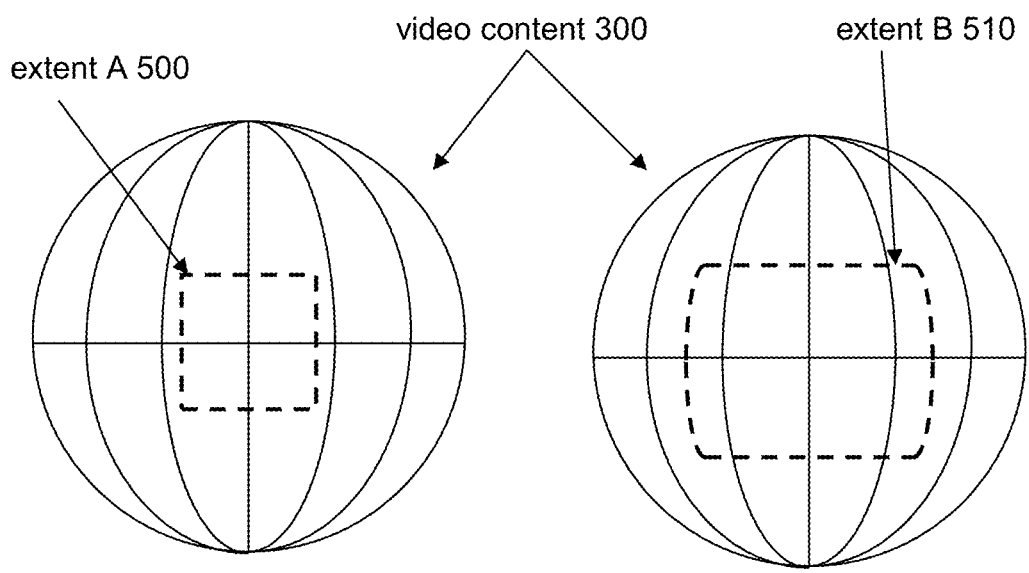
FIGS. 5A-5B illustrate example extents of spherical video content.

A viewing size may define a size (e.g., zoom, viewing angle) of viewable extents of visual content within the video content. A viewing size may define the dimensions of the viewing window. A viewing size may define a size of viewable extents of visual content within the video content selected by a user and/or defined by instructions for viewing the video content as a function of progress through the progress length of the video content (e.g., director track specifying viewing size to be presented as a function of progress through the progress length of the video content). FIGS. 5A-5B illustrate examples of extents for the video content 300. In FIG. 5A, the size of the viewable extent of the video content 300 may correspond to the size of extent A 500. In FIG. 5B, the size of viewable extent of the video content 300 may correspond to the size of extent B 510. Viewable extent of the video content 300 in FIG. 5A may be smaller than viewable extent of the video content 300 in FIG. 5B. Other viewing sizes are contemplated.

In some implementations, a viewing size may define different shapes of viewable extents. For example, a viewing window may be shaped as a rectangle, a triangle, a circle, and/or other shapes. In some implementations, a viewing size may define different rotations of the viewing window (viewing rotation). A viewing size may change based on a rotation of viewing. For example, a viewing size shaped as a rectangle may change the orientation of the rectangle based on whether a view of the video content includes a landscape view or a portrait view. Other rotations of a viewing window are contemplated.

Audio content may refer to media content that may be consumed as one or more sounds. Audio content may include one or more sounds stored in one or more formats/containers, and/or other audio content. Audio content may include one or more sounds captured by one or more sound sensor (e.g., microphone). For example, audio content may include sounds captured by a single microphone or an array of microphones. The sound sensor may receive and convert sounds into sound output signals. The sound output signals may convey sound information and/or other information. The sound information may define audio content in one or more formats, such as WAV, MP3, MP4, RAW.

Audio content may be captured during capture of the video content (e.g., spherical video content). That is, audio content may be captured during/with capture of one or more videos by an image capture device (including optical element(s), image sensor(s), processor(s)). The audio content may be captured by one or more sound sensors of the image capture device (e.g., microphone(s) of and/or coupled to the image capture device) and/or captured by one or more sound sensors separate from the image capture device (e.g., microphone(s) separate from the image capture device).

Audio content may be captured by one or more sound sensors included within an image capture device (e.g., image capture device that captured spherical video content). For example, video content may be captured by an image capture device and audio content may be captured by an audio capture device of the image capture device. Audio content may be captured by one or more sound sensors coupled to the image capture device/one or more components of the image capture device. For example, audio content may be captured by one or more sound sensors coupled (e.g., physically, electrically, wirelessly) to the image capture device/one or more components of the image capture device.

Video content may be captured by an image capture device and the audio content may be captured by an audio capture device separate from the image capture device. For example, audio content may be captured by one or more sound sensors separate from the image capture device. That is, video content may be captured by an image capture device and audio content may be captured by an audio capture device separate from the image capture device.

The sound(s) within the audio content may correspond the sound(s) that were captured when capturing the video content. For example, the video content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other voice.

Captured sounds may be analyzed to identify one or more highlight events within the video content. Highlight events may refer to events of interest captured within the video content. Highlight events may be general (same criteria used to identify highlight events for different persons) or applicable to specific persons (different criteria used to identify highlight events for specific persons).

Audio content may include one or more spatial sounds. Spatial sounds may refer to sounds in which the spatial aspects of the sounds are preserved. Spatial sounds may refer to sounds (e.g., planar 360-sound) within audio content in which the direction of the sounds (e.g., direction from/in which the sound is travelling, spatial relativity of the sound origination to the sound sensor) has been recorded within the audio information (e.g., metadata for audio content). The spatial information relating to sounds within the audio content may be stored using spatial-sound techniques (e.g., surround sound). For example, audio content may include three-dimensional sound field (e.g., captured in Ambisonic format) and/or other spatial sounds. In some implementations, the spatial aspects of sounds may be captured using an array of sound sensors (using time difference of when sound is detected by individual sound sensors).

The audio information may characterize one or more directions of the sounds within audio content. A direction of a sound may refer to a direction from/in which the sound is traveling when captured by an audio capture device. A direction of a sound may indicate the source of the sound and the direction in which the sound is projected from the source of the sound. For example, the audio information may define three-dimensional sound field. Three-dimensional sound field may provide information on spherical surround sound. Particular channels of the audio content may be used to analyze sounds traveling in different directions and/or to analyze omni-directional sounds.

Figure 6A:
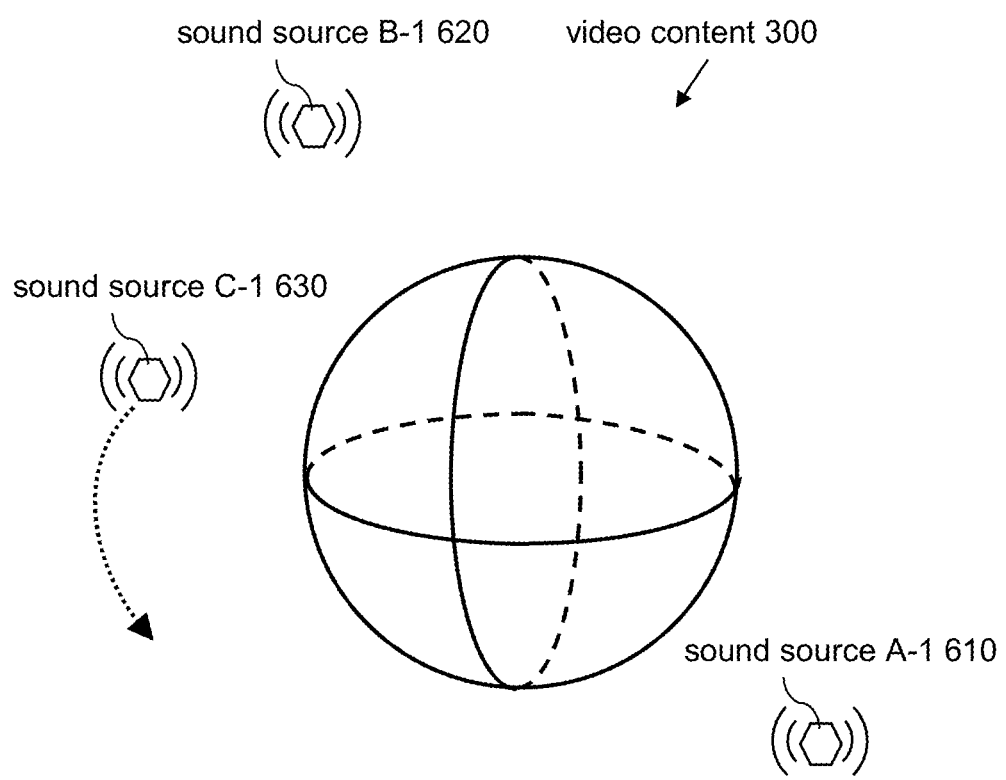
FIG. 6A-6B illustrate example sound sources with respect to spherical video content.

FIG. 6A illustrates example sound sources 610, 620, 630 with respect to the video content 300. The sound source A-1 610 may be located to the front, left, and below the capture of the video content 300. The sound source B-1 620 may be located to the rear, right, and above the capture of the video content 300. The sound source C-1 630 may be located to the right of the capture of the video content 300, and may move from the rear to the front of the capture of the video content 300. Audio content captured based on sounds traveling from the sound sources 610, 620, 630 may include spatial sounds with their spatial relativity with respect to the video content 300 recorded within the audio information.

Figure 6B:
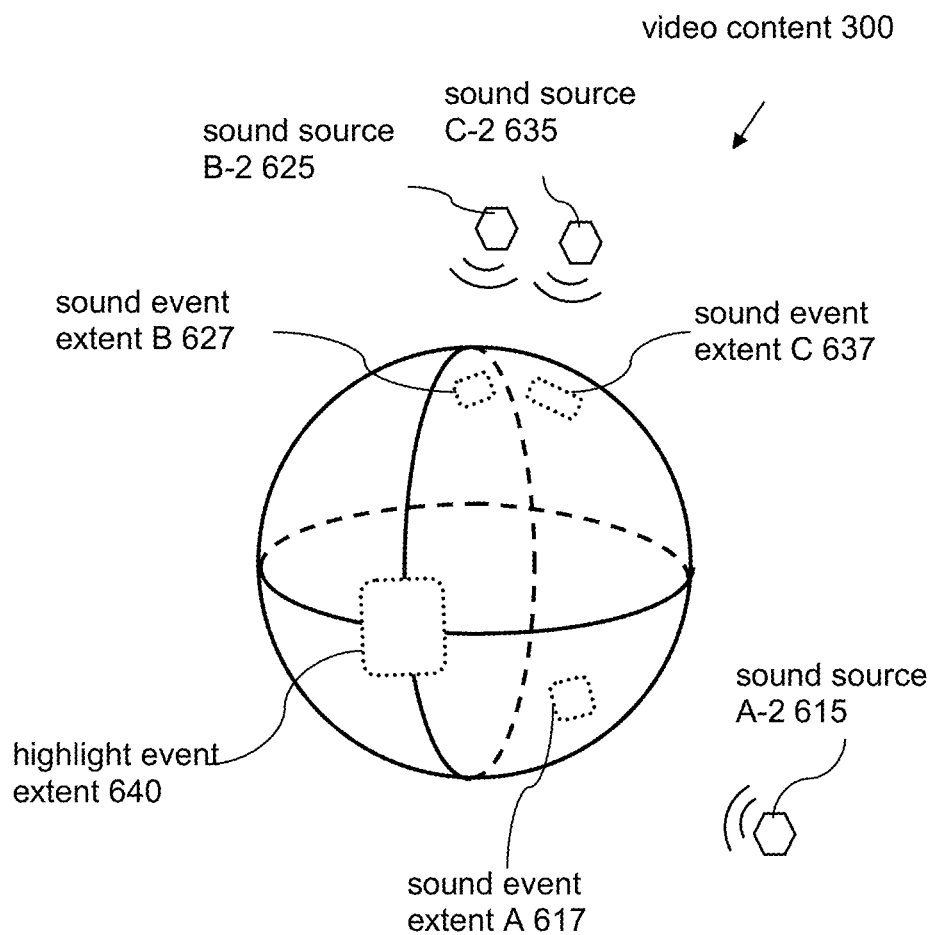

FIG. 6B illustrates example sound sources 615, 625, 635 with respect to the video content 300. The sound source A-2 615 may be located to the front, left, and below the capture of the video content 300. The sound source A-2 615 may project sound toward the front of the video content 300. The sound source B-2 625 and the sound source C-2 635 may be located to the rear and above the capture of the video content 300. The sound source B-2 625 and the sound source C-2 635 may project sound toward the front of the video content 300. Audio content captured based on sounds traveling from the sound sources 615, 625, 635 may include spatial sounds with their spatial relativity with respect to the video content 300 recorded within the audio information.

Such spatial relativity of the spatial sounds with respect to the video content 300 may allow for determination of highlight events based on audio events. The source and direction of sounds (of audio event) within the audio content may be used identify the spatial locations of video capture including highlight events. In addition to using the audio content to identify when a highlight event occurs within the video content (highlight event moment), the audio content may be used to identify where the highlight event occurs within the video (highlight event extent).

The video content and the audio content may be packaged together using a particular format/container. In some implementations, audio content may include audio portion of the video content. That is the audio content may form the audio portion of the video content that may be played back during playback of the video content. The audio information may be part of and/or associated/linked with the video information. That is, the audio information may be contained within the same electronic file that contains the video information or the electronic file containing the audio information may be associated/linked with the electronic file containing the video information. In some implementations, audio content may be separate from the video content. The audio information may be separate (e.g., stored separately from) the video information. That is, the audio information may be contained within an electronic file separate from an electronic file containing the video information. The audio information defining the audio content and the audio information characterizing the directions of the sounds within audio content may be stored together or separately.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying video highlights based on audio. The machine readable instructions 100 may include one or more computer program components. The machine readable instructions 100 may include one or more of a video information component 102, an audio information component 104, an audio event component 106, a temporal type component 108, a spatial type component 110, a highlight event moment component 112, a highlight event extent component 114, a storage component 116, and/or other computer program components. In some implementations, the machine readable instructions 100 may include a video summary component 118.

The video information component 102 may be configured to obtain video information defining one or more video content (e.g., spherical video content) and/or other information. Obtaining video information may include one or more of accessing, acquiring, analyzing, determining, examining, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors. For example, the video information component 102 may obtain video information defining a video while the video is being captured by one or more image sensors. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more video content in which highlights are to be identified. The video information defining the video content may be obtained based on the user's selection of the video content through the user interface/video application.

The audio information component 104 may be configured to obtain audio information defining one or more audio content and/or other information. Obtaining audio information may include one or more of accessing, acquiring, analyzing, determining, examining, loading, locating, opening, receiving, retrieving, reviewing, storing, and/or otherwise obtaining the audio information. The audio information component 104 may obtain audio information from one or more locations. For example, the audio information component 104 may obtain audio information from a storage location, such as the electronic storage 13, electronic storage of information and/or signals generated by one or more sound sensors, electronic storage of a device accessible via a network, and/or other locations. The audio information component 104 may obtain audio information from one or more hardware components (e.g., a sound sensor) and/or one or more software components (e.g., software running on a computing device).

The audio information component 104 may be configured to obtain audio information during acquisition of the audio content and/or after acquisition of the audio content by one or more sound sensors. For example, the audio information component 104 may obtain audio information defining sounds while the sounds are being captured by one or more sound sensors. The audio information component 104 may obtain audio information defining sounds after the sounds have been captured and stored in memory (e.g., the electronic storage 13).

In some implementations, the audio information may be obtained based on user interaction with a user interface/application (e.g., video editing application), and/or other information. For example, a user interface/application may provide option(s) for a user to select one or more audio content based on which highlights in video content are to be identified. The audio information defining the audio content may be obtained based on the user's selection of the audio content through the user interface/video application. As another example, a user interface/application may provide option(s) for a user to select one or more video content in which highlights are to be identified. The audio information may define audio content of the video content. The audio defining the audio content may be obtained based on the user's selection of the video content through the user interface/video application.

The audio event component 106 may be configured to identify one or more audio events within the audio content. An audio event may refer to an occurrence of one or more particular sounds of interest within the audio content. An audio event may indicate an occurrence of a highlight event within the video content based on one or more of the sounds within the audio content and/or other information. The audio event component 106 may to identify one or more audio events within the audio content based on satisfaction of one or more criteria by one or more sounds within the audio content.

One or more of the sounds indicating an occurrence of a highlight event may be of one or more particular intensities and/or one or more particular patterns. The audio event component 106 may analyze the audio content to identify audio event based on the sounds satisfying one or more criteria. For example, the audio event component 106 may identify audio events based on detection of sounds with particular intensity, particular pattern, and/or other sound characteristics associated with highlight events (e.g., exclamation, shout, intense source, laughter). The audio event component 106 may identify audio events based on one or more detection of particular terms, one or more particular combinations of terms, and/or other sounds. For example, one or more particular phrases (e.g., "Wow," "Watch this,"

"Watch me," "Look at____") may be associated with a highlight event that has just occurred, is occurring, and/or is about to occur. In some implementations, the audio event component 106 may differentiate sounds made by different sources (e.g., male vs female, child vs adult, specific persons). The sounds made by different sources may be analyzed differently to identify the audio event(s) within the audio content. For example, the criteria for identifying audio events based on sounds made by a child may be different from the criteria for identifying audio events based on sounds made by an adult (e.g., lower intensity required to identify an audio event for a child compared to an adult).

An audio event may occur at an audio event moment within the progress length of the video content. An audio event moment may correspond to a point or a duration within the progress length of the video content. In some implementations, one or more of the sounds indicating an audio event/highlight event may originate from one or more audio sources captured within the video content. The audio source(s) may be captured within an audio event extent within the video content at the audio event moment. The audio event extent may be characterized by an audio viewing direction, an audio viewing size, and/or other information. An audio viewing direction may define the angle/portion of the video content at which the audio source(s) is located/captured. An audio viewing size may define a size (e.g., zoom, viewing angle) of the extents of the visual content in which the audio source(s) is located/captured. The size of the audio event extent (audio viewing size) may include one or more portions of the sound sources that generate the sounds. In some implementations, the size of the audio event extent may depend on the particular event/type of event captured within the video content.

For example, referring to FIG. 6B, sounds indicating an audio event/highlight event may originate from the sound sources 615, 625, 635. The sound source A-2 615 may be captured within a sound event extent A 617 (characterized by a particular viewing direction and viewing size) within the video content 300 at an audio event moment. The sound source B-2 625 may be captured within a sound event extent B 627 (characterized by a particular viewing direction and viewing size) within the video content 300 at an audio event moment. The sound source B-C 635 may be captured within a sound event extent C 637 (characterized by a particular viewing direction and viewing size) within the video content 300 at an audio event moment.

Audio event extents within the video content may be determined based on one or more of directions of sounds, video analysis, and/or other information. The audio viewing direction and/or the audio viewing size may be determined based on one or more of directions of sounds, video analysis, and/or other information. That is, the direction and bounding box (approximate size) of the source producing the sounds for the audio event within the video content may be identified based on one or more of directions of sounds, video analysis, and/or other information. For example, audio event component 106 may analyze the directional channels of the audio content to localize particular sound source(s) (e.g., strongest sound source(s), sound sources of particular phrase) within the captured video content and approximate the source size.

As another example, the audio event component 106 may use video analysis to identify sound sources that generate particular sounds. Based on a given sound indicating an audio event being identified at a given audio event moment, the visuals of the video content at the given audio moment may be analyzed to find the source that produced the given sound. For example, the given sound indicating an audio event may be a particular phase and the visuals of the video content may be analyzed to determine the person that spoke the particular phase, such as by matching the particular phrase to the mouth movement of the person. As another example, the given sound indicating an audio event may be cheering and the visuals of the video content may be analyzed to determine the person(s) that are cheering, such as by matching the cheering to the mouth movement of the person(s) and/or other gestures that are associated with cheering (e.g., raising hand(s), jumping).

The temporal type component 108 may be configured to determine a temporal type of an audio event. Temporal type may refer to categorization of the audio event relating to temporality of the highlight event with respect to the audio event. Temporal type may provide guidance with respect to relative temporality of the highlight event with respect to the audio event. That is, the temporal type may indicate when in the progress length of the video content the highlight event occurs with respect to when the audio event occurs. The temporal type may indicate whether the highlight event occurs before, during, and/or after the audio event. The temporal type may indicate general differences (e.g., at the same time, short duration apart/overlap, long duration apart/overlap) in the occurrences of the highlight events with respect to audio events. The temporal type of indicate specific differences (e.g., specific duration specified in terms of time and/or frame numbers) in the occurrences of the highlight events with respect to audio events. The temporal type of the audio event may provide for temporal alignment of the highlight event with respect to the audio event.

For example, a given sound indicating an audio event (e.g., "Did you see that?") may be a temporal type where a highlight event occurs before the audio event. A given sound indicating an audio event (e.g., cheering, screaming, laughing, loud noise) may be a temporal type where a highlight event occurs with/during the audio event. A given sound indicating an audio event (e.g., "Watch this.") may be a temporal type where a highlight event occurs after the audio event. In some implementations, the timing of temporal alignment may depend on the type of the event. For example, the timing of temporal alignment for a fast action event may be shorter than the timing of temporal alignment for a slow action event. The timing of temporal alignment for a particular event/type of event may be shorter/longer than the timing of temporal alignment for another event/type of event. Other sounds, correspondences to temporal types of audio events, and temporal alignments are contemplated.

The spatial type component 110 may be configured to determine a spatial type of an audio event. Spatial type may refer to categorization of the audio event relating to relative spatiality of the highlight event with respect to the audio event. Spatial type may provide guidance with respect to relative spatiality of the highlight event with respect to the audio event. That is, the spatial type may indicate where in the visual content of the video content the highlight event occurs with respect to where the audio event occurs. The spatial type may indicate whether the highlight event occurs co-located or not co-located with the audio event. The spatial type of the audio event may provide for spatial alignment of the highlight event with respect to the audio event.

For example, a given sound indicating an audio event (e.g., "Watch this.") may be a spatial type where the highlight event is co-located with the audio event. For example, the highlight event may be an action performed by the person who produced the given sound. A given sound indicating an audio event (e.g., "Look at that!") may be a spatial type where the highlight event is not co-located with the audio event. For example, the highlight event may be an action performed by a person who did not produce the given sound.

In some implementations, the directions of the sounds indicating an audio event may indicate that the audio event is of a spatial type that is or is not co-located with the highlight event. For example, one or more sound sources producing sounds in multiple directions (not towards any particular location) may indicate that the audio event is of a spatial type that is co-located with the highlight event (e.g., person screaming while performing a highlight event). For example, referring to FIG. 6A, the sound source C-1 630 may produce sounds in different direction as it is traveling, and may indicate that the highlight event is co-located with the audio event. That is, the highlight event occurs where the audio event is occurring (e.g., with the motion of the sound source C-1 630). One or more sound sources producing sounds in the same direction (towards the same location) may indicate that the audio event is of a spatial type that is not co-located with the highlight event (e.g., people viewing a highlight event may be facing the highlight event and produce sounds in the direction of the highlight event). For example, referring to FIG. 6B, the sounds produced by the sound sources 615, 625 may be both directed towards the front of the video content 300, and may indicate that the highlight event is located away from the sound sources 625, 635 and may be captured within the front portion of the video content 300. The sounds produced by the sound source A-2 615 may also be directed towards the front of the video content 300, and may further indicate that the highlight event may be captured within the front portion of the video content 300. Other sounds, correspondences to spatial types of audio events, and spatial alignments are contemplated.

The highlight event moment component 112 may be configured to identify a highlight event moment of the highlight event based on the audio event moment, the temporal type of the audio event, and/or other information. A highlight event may refer to an occurrence of one or more events of interest within the video content. A highlight event moment may refer to a point or a duration within the progress length of the video content at which the highlight event occurs/is captured. The highlight event may occur at the highlight event moment within the progress length of the video content. The highlight event moment component 112 may identify the highlight event moment by using the temporal type of the audio event to temporally align the highlight event with respect to the audio event. That is, the highlight event moment component 112 may determine when in the progress length of the video content the highlight event occurs based on offset from the audio event moment.

For example, based on the temporal type of the audio event indicating the highlight event occurring before the audio event, the highlight event moment component 112 may determine the highlight event moment to be before the audio event moment. Based on the temporal type of the audio event indicating the highlight event occurring during the audio event, the highlight event moment component 112 may determine the highlight event moment to be during the audio event moment (e.g., same as the audio event moment, overlapping with the audio event moment). Based on the temporal type of the audio event indicating the highlight event occurring after the audio event, the highlight event moment component 112 may determine the highlight event moment to be after the audio event moment. The alignment (e.g., amount of offset/overlap) of the highlight event moment with respect to the audio event moment may be general (e.g., at the same time, short duration apart/overlap, long duration apart/overlap) or specific (e.g., specific duration specified in terms of time and/or frame numbers).

In some implementations, the alignment of the highlight event moment with respect to the audio event moment may be determined based on the particular event/type of event captured within the video content, user input, and/or other information. For example, the amount of time/frames by which the highlight event moment is offset from/overlaps with the audio event moment may change based on the particular event/type of event being captured (e.g., amount of offset/overlap for a fast action event may be shorter than amount of offset/overlap for a slow action event). The amount of time/frames by which the highlight event moment is offset from/overlaps with the audio event moment may be changed by user input (e.g., user control of settings for temporal alignment between the highlight event moment and the audio event moment).

The highlight event extent component 114 may be configured to identify a highlight event extent of the highlight event based on the audio event extent, the spatial type of the audio event, and/or other information. A highlight event may be captured within a highlight event extent within the spherical video content at a highlight event moment. The highlight event extent may be characterized by a highlight viewing direction, a highlight viewing size, and/or other information. A highlight viewing direction may define the angle/portion of the video content at which the highlight event is located/captured. A highlight viewing size may define a size (e.g., zoom, viewing angle) of the extents of the visual content in which the highlight event is located/captured. The size of the highlight event extent (highlight viewing size) may include one or more portions of the person/object involved in the highlight event. In some implementations, the size of the highlight event extent may depend on the particular event/type of event captured within the video content.

The spatial type may provide that the highlight event occurs co-located with the audio event, and the highlight event extent component 114 may identify the highlight event extent to be the same as the audio event extent. For example, referring to FIG. 6A, an audio event may be identified based on sounds produced by the sound source B-1 620 and the spatial type may provide that the highlight event occurs co-located with the audio event (e.g., at the audio event moment). The highlight event extent component 114 may identify the highlight event extent to be the audio event extent of the sound source B-1 620.

In some implementations, the spatial type may provide that the highlight event occurs co-located with the audio event, and the highlight event extent component 114 may identify the highlight event extent based on tracking an object within the audio event extent and/or other information. For example, referring to FIG. 6A, an audio event may be identified based on sounds produced by the sound source C-1 630 and the spatial type may provide that the highlight event occurs co-located with the audio event (e.g., before and/or after the audio event moment). The highlight event extent component 114 may identify the highlight event extent by tracking the movement of an object within the audio event extent at the audio event moment (e.g., the sound source C-1 630). The audio source(s) of the audio event/audio event extent may be visually tracked (backwards and/or forwards) in the progress length of the video content to determine the highlight viewing direction and the highlight viewing size. In some implementations, the highlight viewing direction and the highlight viewing size may change as a function of the progress length of the video content to track object movement.

The spatial type may provide that the highlight event does not occur co-located with the audio event, and the highlight event extent component 114 may identify the highlight event extent based on a relative location of the audio source(s) with respect to an image capture device that captured the video content (e.g., spherical video content), one or more directions of the one or more of the sounds originating from the audio source(s), and/or other information. That is, sounds associated with highlight events (e.g., exclamation, shout) may be directed towards the highlight event and the direction of the sounds may be used to determine where the highlight event occurs within the video content. For example, referring to FIG. 6B, an audio event may be identified based on sounds produced by the sound sources 615, 625, 635 and the spatial type may provide that the highlight event does not occur co-located with the audio event (e.g., at the audio event moment, before and/or after the audio event moment). The highlight event extent component 114 may identify the highlight event extent (e.g., highlight event extent 640) to be located in the front portion of the video content 300 based on the sounds produced by the sound sources 615, 625, 635 being projected toward the front of the video content 300 (e.g., towards a location in front of the image capture device that captured the video content 300). In some implementations, the highlight event extent may change as a function of the progress length of the video content to track movement of one or more objects within the highlight event extent.

The spatial type may provide that the highlight event does not occur co-located with the audio event, and the highlight event extent component 114 may identify the highlight event extent based on a relative location of the audio source(s) with respect to an image capture device that captured the video content (e.g., spherical video content), a gaze analysis within the audio event extent, and/or other information. That is, gaze of person(s) (at the audio event moment/at the highlight event moment) may be directed towards the highlight event and the gaze direction(s) may be used to determine where the highlight event occurs within the video content. In some implementations, the highlight event extent may change as a function of the progress length of the video content based on changes in gaze directions within the video content.

In some implementations, the size of the highlight event extent may be determined by tracking gaze direction over a period of time. That is, the highlight event extent component 114 may use gaze direction tracking over a period of time to determine the area(s) being looked at by person(s) and determine the size of the highlight event extent to cover such area(s). In some implementations, the gaze directions may be used to identify potential locations of interest within the video content and visual analysis/computer vision may be performed at/near such locations to identify the event of interest. Localization of the visual analysis/computer vision at/near such locations may provide for resource savings (e.g., computing power, memory, time) compared to performing visual analysis/computer vision over the entirety of the video content. In some implementations, the size of the highlight event extent may be scaled based on distance between the highlight event and the image capture device that captured the video content, the distance between the highlight event and the source of the sounds, and/or other information.

The spatial type may provide that the highlight event does not occur co-located with the audio event, and the highlight event extent component 114 may identify the highlight event extent based on a relative location of the audio source(s) with respect to an image capture device that captured the video content (e.g., spherical video content), a gesture analysis within the audio event extent, and/or other information. That is, gesture of person(s) (at the audio event moment/at the highlight event moment) may be directed towards the highlight event and the gesture direction(s) may be used to determine where the highlight event occurs within the video content. In some implementations, the highlight event extent may change as a function of the progress length of the video content based on changes in gestures within the video content.

In some implementations, the size of the highlight event extent may be determined by tracking gesture direction over a period of time. That is, the highlight event extent component 114 may use gesture direction tracking over a period of time to determine the area(s) being gestured (e.g., pointed) at by person(s) and determine the size of the highlight event extent to cover such area(s). In some implementations, the gesture directions may be used to identify potential locations of interest within the video content and visual analysis/computer vision may be performed at/near such locations to identify the event of interest. Localization of the visual analysis/computer vision at/near such locations may provide for resource savings (e.g., computing power, memory, time) compared to performing visual analysis/computer vision over the entirety of the video content. In some implementations, the size of the highlight event extent may be scaled based on distance between the highlight event and the image capture device that captured the video content, the distance between the highlight event and the source of the sounds, and/or other information.

In some implementations, the highlight event extent component 114 may identify the highlight event extent based on a combination of two or more of the above methods. For example, the highlight event extent component 114 may identify the highlight event extent based on two or more of direction of sounds, gaze analysis, gesture analysis, and/or other information.

Figure 7:
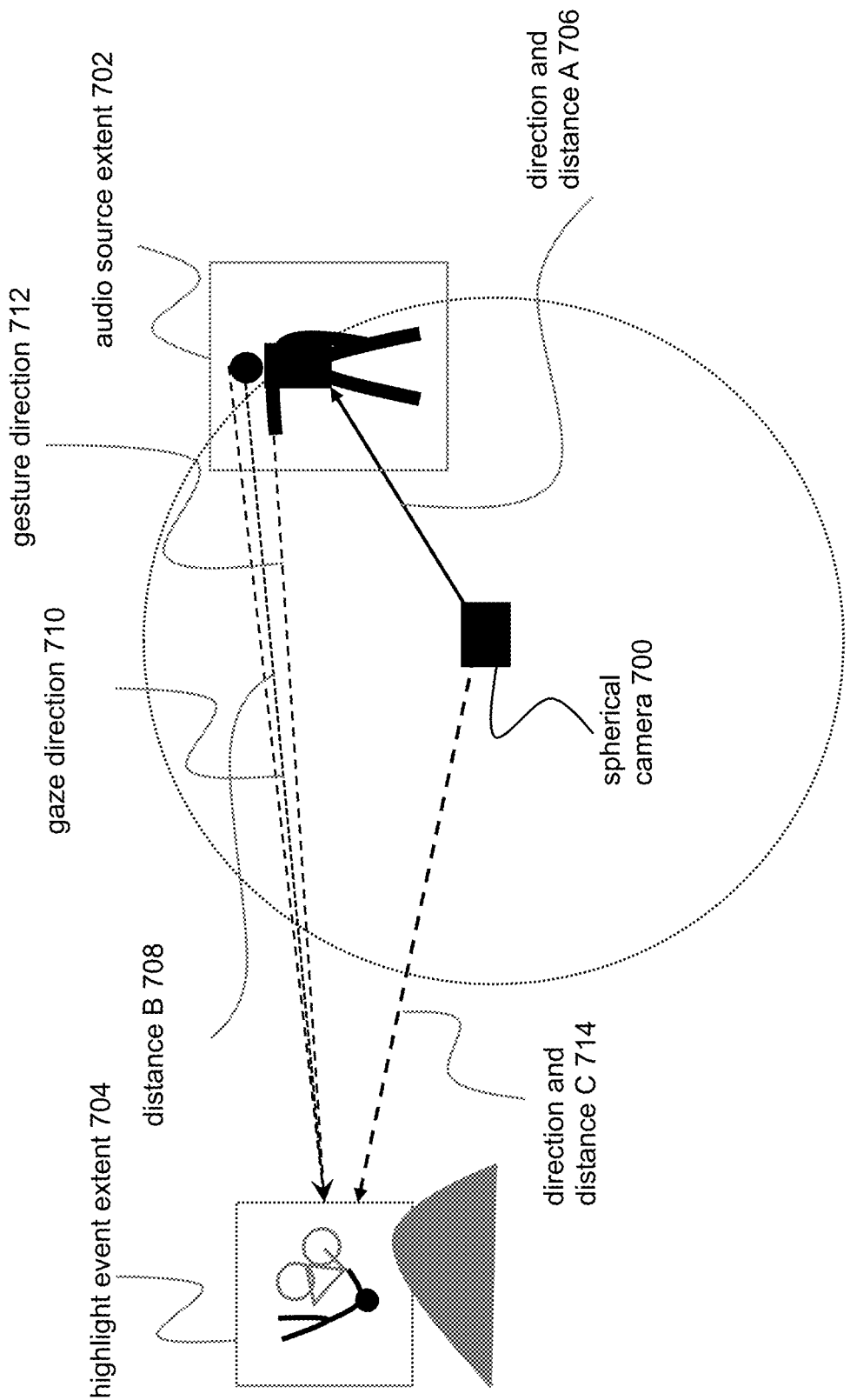
FIG. 7 illustrates an example identification of an event of interest based on audio.

FIG. 7 illustrates an example identification of an event of interest based on audio. When and where an event of interest occurs within spherical video content may be identified based on sounds made by a sound source. When and where an event of interest occurs within spherical video content may be identified based how person(s) near a spherical camera 700 acted during capture of spherical video content. For example, an event of interest may be captured within spherical video content by the spherical camera 700. The spherical video content may include visual capture of an audio source (person) within an audio source extent 702 and a highlight event within a highlight event extent 704. The sound(s) produced by the audio source may indicate an occurrence of a highlight event. To identify the highlight event extent 704 within the spherical video content, direction and distance A 706 between the spherical camera 700 and the audio source may be determined. For example, the direction and distance A 706 to the audio source may be determined based on approximating the size of the audio source (e.g., by recognizing age group, male, female) and the relative pixel measure of the audio source within the video content. Such determination make take into account lens distortion and subject position within the video content. In some implementations, the spherical camera 700 may move while capturing the spherical video content and the different positions of the spherical camera 700 with a known spatial separation may be used to analyze the change in the relative size of the audio source and determine the direction and distance A 706. In some implementations, other directional sensor modalities (e.g., stereo sensor pair, radar) may be used to determine the direction and distance A 706.

Visual analysis/computer vision may be performed within a bounding box (e.g., audio source extent 702) around the audio source to identify actions (e.g., psychophysiological responses, such as gesturing, physical movements, eyes wide open) and interpret such actions to identify a direction to the highlight event from the audio event location. For example, gaze analysis may be used to determine the gaze direction 710 in which the audio source is looking. Gaze analysis may take into different consideration factors, such as distance between the image capture device to a person's face, face asymmetry, direction the face is facing, pupil positions (relative to the eye ball center/nose line), and/or other information. Gesture analysis may be used to determine the gesture direction 612 in which the audio source is pointing (e.g., via hand, finger(s)). For example, the gesture direction 612 may be determined based on body orientation (e.g., from asymmetries of the body in the video content) and arm direction with respect to the body (e.g., by connecting the pointing hand/finger to the same arm, shoulder, or elbow and interpreting the relative arm size given the known subject size).

To determine the distance B 708 between the highlight event and the audio source, one or more modalities may be used. For example, gaze analysis may be used to determine the intersection of the gaze direction of each eye (as determine by pupil position relative to the eye ball center). Gaze analysis and gesture analysis may be combined to look for intersection of the gaze direction 710 and the gesture direction 720. If multiple subjects as associated with an audio event, intersection of combination of similar gazes and/or pointing directions may be used. In some implementations, an approximation may assume a certain distance to the highlight event, and a large bounding box area may be used as a starting point for refinement in identifying the highlight event.

The direction and distance 706, the distance B 708, the direction of the audio source to the highlight event, and/or other information may be used to determine the direction and distance C 714 of the highlight event with respect to the spherical camera 700 (and corresponding highlight viewing direction/highlight viewing size in the spherical video content). In some implementations, if the distance between the spherical camera 700 and the audio source is small, the direction/distance from the spherical camera 700 to the highlight event may be approximated to be the same as the direction/distance between the audio source and the highlight event.

The highlight viewing size of the highlight event extent 704 may be determined based on tracking gaze direction and/or tracking gesture direction over a period of time. In some implementations, a preliminary highlight viewing size may be used and visual analysis/computer vision may be used within the preliminary highlight viewing size to identify a more accurate highlight viewing size. For example, a set of interesting physical sizes (e.g., 30 cm, 1 m, 5 m, 10 m) and/or interesting fields of view for the highlight event may be used, and the visual analysis/computer vision may be used within the sizes/fields of view. Visual analysis/computer vision may be used to identify a more accurate highlight viewing angle.

The storage component 116 may be configured to effectuate storage of the identification of the highlight event moment, the identification of the highlight event extent, and/or other information in one or more storage media. In some implementations, the storage component 116 may effectuate storage of the identification of the highlight event moment, the identification of the highlight event extent, and/or other information in one or more storage locations including the video information, the audio information, and/or other storage locations. For example, the video information/audio information may have been obtained from the electronic storage 13 and the identification of the highlight event moment and the highlight event extent may be stored in the electronic storage 13. In some implementations, the storage component 108 may effectuate storage of the identification of the highlight event moment and the highlight event extent in one or more remote storage locations (e.g., storage media located at/accessible through a server).

In some implementations, the storage component 116 may effectuate storage of the identification of the highlight event moment and the highlight event extent through one or more intermediary devices. For example, the processor 11 may be located within an image capture device without a connection to the storage device (e.g., the image capture device lacks WiFi/cellular connection to the storage device). The storage component 116 may effectuate storage of the identification of the highlight event moment and the highlight event extent through another device that has the necessary connection (e.g., the image capture device using a WiFi/cellular connection of a paired mobile device, such as a smartphone, tablet, laptop, to store information in one or more storage media). Other storage locations for and storage of the identification of the highlight event moment and the highlight event extent are contemplated.

In some implementations, the identification of the highlight event moment and the identification of the highlight event extent may be stored as tag/metadata for the video content. The tag/metadata may provide the highlight event moment within a time stamp and provide the highlight event extent as the relative position of the highlight event within the video content, along with the bounding box within which the highlight event occurs. The tag/metadata for the video content may, based on the identification of the highlight event moment and the identification of the highlight event extent, prompt/direct a viewer of the video content to view the highlight event. For example, the tag/metadata for the video content may be used to alert a viewer of the video content that the viewing window does not contain a highlight event that is about to occur, that is occurring, or that just occurred. The tag/metadata for the video content may be used to provide a link/shortcut/interface options through which the view of the video content may change the viewing window to include the highlight event except at the highlight event moment.

The identification of the highlight event moment and the highlight event extent may be stored with the video content, separately from the video content, with the audio content, separately from the audio content, and/or in other forms. In some implementations, the identification of the highlight event moment and the highlight event extent may be stored within one or more files (e.g., director track) that describe how the video content/audio content may be presented during playback. For example, the identification of the highlight event moment and the highlight event extent may be stored within a director track such that the viewing window for the playback to includes the highlight event extent and the highlight event moment. As another example, the identification of the highlight event moment and the highlight event extent may be stored such that viewers of the video content may be notified regarding the highlight event (e.g., highlight event about to occur in the playback, highlight event occurring in the playback, highlight event that has occurred in the playback) during playback. Such notification may enable the viewer to change the viewing window to include see the highlight event.

In some implementations, the identification of the highlight event moment and the identification of the highlight event extent may be used to identify particular visuals captured within the video content. For example, visual analysis/computer vision may be performed at/near the highlight event extent at/near the highlight event moment to identify classes of subjects/events which are of interest to users/viewers. For example, at/near the highlight event extent and the highlight event moment, visual analysis/computer vision may be used to identify persons, persons in motion, gestures, emotion (e.g., smiling, frowning), animals, objects associated with a given activity (e.g., activity equipment such as a surfing board, activity scene/environment such as a wave), actions (e.g., jumps, dancing). Localization of the visual analysis/computer vision to/near the highlight event extent and the highlight event moment may provide for resource savings (e.g., computing power, memory, time) compared to performing visual analysis/computer vision over the entirety of the video content. In some implementations, the visual analysis/computer vision may be used to determine different amounts of interest levels, certainty of identification, and/or other metrics at various portions (in time and space) within the video content. Other uses of the identification of the highlight event moment and the identification of the highlight event extent are contemplated.

The video summary component 118 may be configured to generate one or more video summaries. A video summary may refer to an edit of video content that includes one or more portions of the video content (e.g., spherical video content). The portion(s) of the video content may include the highlight event based on the highlight event moment, the highlight event extent, and/or other information. For example, two highlight events may be included within the video content, and the video summary component 118 may create a video edit that includes the two highlight events based on the highlight event moments and the highlight event extents of the two highlight events. In some implementations, the video summary component 118 may include other portions of the video content, such as video portions surrounding (in time and/or space) the highlight events to provide buffer for the highlight events. In some implementations, the highlight events included in the video summary may be ordered (based on interest metric) and/or transitions may be inserted between the highlight events. Such generation of video summaries may provide for automatic edits (e.g., preview, summary, quick story) of the video content using the temporal (when) and spatial locations (viewing direction, viewing size) of the highlight events.

In some implementations, automatic edits may employ certain variables determined by a video editor, such as length of edit, musical track, story style, framing style, and/or other information. For example, an interest merit metric may be calculated for subjects/events identified via audio and/or image analysis over the progress length of the video content. Based on the interest merit metric satisfying a certain threshold (e.g., passing), the highlight event may be tagged. The highlight event may be associated with an interest event metric, which may be associated with the interest merit metric. The interest metrics may be used to identify/generate highlight events, emphasize various aspects of the subjects/events to be highlighted (e.g., amount of action, loudness, appearance of humans). For example, it may be desirable for a video summary to be action-packed or focused on people, and action-interest metric or the persons-interest metric may be prioritized to be used in generating the video summary.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
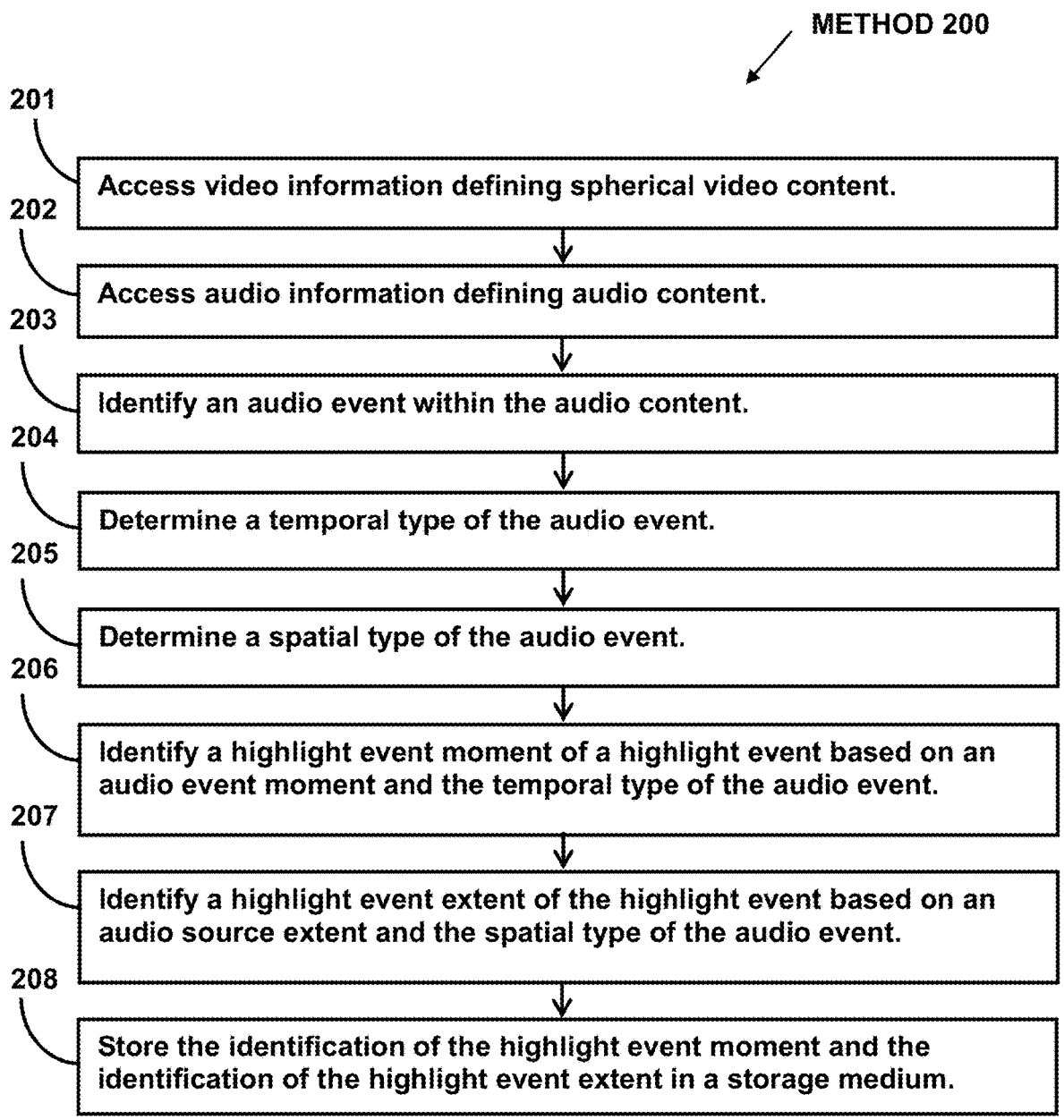
FIG. 2 illustrates a method for identifying video highlights based on audio.

FIG. 2 illustrates method 200 for identifying video highlights based on audio. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be obtained. The spherical video content may have a progress length. The spherical video content may define visual content viewable from a point of view as a function of progress through the spherical video content. In some implementation, operation 201 may be performed by a processor component the same as or similar to the video information component 102 (Shown in FIG. 1 and described herein).

At operation 202, audio information defining audio content may be obtained. The audio content may be captured during capture of the spherical video content. The audio information may characterize one or more directions of sounds within the audio content. In some implementations, operation 202 may be performed by a processor component the same as or similar to the audio information component 104 (Shown in FIG. 1 and described herein).

At operation 203, an audio event may be identified within the audio content. The audio event may indicate an occurrence of a highlight event based on one or more of the sounds within the audio content. The audio event may occur at an audio event moment within the progress length. The one or more of the sounds may originate from one or more audio sources captured within an audio event extent within the spherical video content at the audio event moment. The audio event extent may be characterized by an audio viewing direction and an audio viewing size. In some implementations, operation 203 may be performed by a processor component the same as or similar to the audio event component 106 (Shown in FIG. 1 and described herein).

At operation 204, a temporal type of the audio event may be determined. The temporal type may provide guidance with respect to relative temporality of the highlight event with respect to the audio event. In some implementations, operation 204 may be performed by a processor component the same as or similar to the temporal type component 108 (Shown in FIG. 1 and described herein).

At operation 205, a spatial type of the audio event may be determined. The spatial type may provide guidance with respect to relative spatiality of the highlight event with respect to the audio event. In some implementations, operation 205 may be performed by a processor component the same as or similar to the spatial type component 110 (Shown in FIG. 1 and described herein).

At operation 206, a highlight event moment of the highlight event may be identified based on the audio event moment and the temporal type of the audio event. The highlight event may occur at the highlight event moment within the progress length. In some implementations, operation 206 may be performed by a processor component the same as or similar to the highlight event moment component 112 (Shown in FIG. 1 and described herein).

At operation 207, a highlight event extent of the highlight event may be identified based on the audio event extent and the spatial type of the audio event. The highlight event extent may be characterized by a highlight viewing direction and a highlight viewing size. The highlight event may be captured within the highlight event extent within the spherical video content at the highlight event moment. In some implementations, operation 207 may be performed by a processor component the same as or similar to the highlight event extent component 114 (Shown in FIG. 1 and described herein).

At operation 208, the identification of the highlight event moment and the identification of the highlight event extent may be stored in a storage medium. In some implementations, operation 208 may be performed by a processor component the same as or similar to the storage component 116 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies video highlights based on audio, the system comprising:
    one or more physical processors configured by machine-readable instructions to:
        obtain video information defining video content, the video content having a progress length, the video content defining visual content viewable as a function of progress through the progress length of the video content;
        obtain audio information defining audio content, the audio content captured during capture of the video content, the audio information characterizing one or more directions of sounds within the audio content;
        identify an audio event within the audio content based on one or more of the sounds within the audio content, the audio event occurring at an audio event moment within the progress length, the one or more of the sounds originating from one or more audio sources captured within an audio event extent within the video content at the audio event moment, wherein the audio event is associated with a temporal type and a spatial type, the temporal type providing guidance with respect to relative temporality of a highlight event with respect to the audio event and the spatial type providing guidance with respect to relative spatiality of the highlight event with respect to the audio event;
        identify a highlight event moment of the highlight event based on the audio event moment and the temporal type of the audio event, the highlight event occurring at the highlight event moment within the progress length;
        identify a highlight event extent of the highlight event based on the audio event extent and the spatial type of the audio event, the highlight event captured within the highlight event extent within the video content at the highlight event moment; and
        effectuate storage of the identification of the highlight event moment and the identification of the highlight event extent in a storage medium.

2. The system of claim 1, wherein the spatial type provides that the highlight event occurs co-located with the audio event, and the highlight event extent is identified to be the same as the audio event extent.

3. The system of claim 1, wherein the spatial type provides that the highlight event occurs co-located with the audio event, and the highlight event extent is identified based on tracking an object within the audio event extent.

4. The system of claim 1, wherein the spatial type provides that the highlight event does not occur co-located with the audio event, and the highlight event extent is identified based on a relative location of the one or more audio sources with respect to an image capture device that captured the video content and one or more directions of the one or more of the sounds originating from the one or more audio sources.

5. The system of claim 1, wherein the spatial type provides that the highlight event does not occur co-located with the audio event, and the highlight event extent is identified based on a relative location of the one or more audio sources with respect to an image capture device that captured the video content and a gaze analysis within the audio event extent.

6. The system of claim 1, wherein the spatial type provides that the highlight event does not occur co-located with the audio event, and the highlight event extent is identified based on a relative location of the one or more audio sources with respect to an image capture device that captured the video content and a gesture analysis within the audio event extent.

7. The system of claim 1, wherein the one or more of the sounds include a particular term or a particular combination of terms.

8. The system of claim 1, wherein the one or more of the sounds are of a particular intensity and/or a particular pattern.

9. The system of claim 1, wherein the one or more physical processors are further configured by the machine-readable instruction to generate a video summary including a portion of the video content, the portion of the video content including the highlight event based on the highlight event moment and the highlight event extent.

10. A method for identifying video highlights based on audio, the method performed by a computing system including one or more physical processors, the method comprising:
    obtaining, by the computing system, video information defining video content, the video content having a progress length, the video content defining visual content viewable a function of progress through the progress length of the video content;
    obtaining, by the computing system, audio information defining audio content, the audio content captured during capture of the video content, the audio information characterizing one or more directions of sounds within the audio content;
    identifying, by the computing system, an audio event within the audio content based on one or more of the sounds within the audio content, the audio event occurring at an audio event moment within the progress length, the one or more of the sounds originating from one or more audio sources captured within an audio event extent within the video content at the audio event moment, wherein the audio event is associated with a temporal type and a spatial type, the temporal type providing guidance with respect to relative temporality of a highlight event with respect to the audio event and the spatial type providing guidance with respect to relative spatiality of the highlight event with respect to the audio event;

identifying, by the computing system, a highlight event moment of the highlight event based on the audio event moment and the temporal type of the audio event, the highlight event occurring at the highlight event moment within the progress length;

identifying, by the computing system, a highlight event extent of the highlight event based on the audio event extent and the spatial type of the audio event, the highlight event captured within the highlight event extent within the video content at the highlight event moment; and effectuating storage, by the computing system, of the identification of the highlight event moment and the identification of the highlight event extent in a storage medium.

11. The method of claim 10, wherein the spatial type provides that the highlight event occurs co-located with the audio event, and the highlight event extent is identified to be the same as the audio event extent.

12. The method of claim 10, wherein the spatial type provides that the highlight event occurs co-located with the audio event, and the highlight event extent is identified based on tracking an object within the audio event extent.

13. The method of claim 10, wherein the spatial type provides that the highlight event does not occur co-located with the audio event, and the highlight event extent is identified based on a relative location of the one or more audio sources with respect to an image capture device that captured the video content and one or more directions of the one or more of the sounds originating from the one or more audio sources.

14. The method of claim 10, wherein the spatial type provides that the highlight event does not occur co-located with the audio event, and the highlight event extent is identified based on a relative location of the one or more audio sources with respect to an image capture device that captured the video content and a gaze analysis within the audio event extent.

15. The method of claim 10, wherein the spatial type provides that the highlight event does not occur co-located with the audio event, and the highlight event extent is identified based on a relative location of the one or more audio sources with respect to an image capture device that captured the video content and a gesture analysis within the audio event extent.

16. The method of claim 10, wherein the one or more of the sounds include a particular term or a particular combination of terms.

17. The method of claim 10, wherein the one or more of the sounds are of a particular intensity and/or a particular pattern.

18. The method of claim 10, further comprising generating, by the computing system, a video summary including a portion of the video content, the portion of the video content including the highlight event based on the highlight event moment and the highlight event extent.

19. A system that identifies video highlights based on audio, the system comprising:

one or more physical processors configured by machine-readable instructions to:

obtain video information defining video content, the video content having a progress length, the video content defining visual content viewable as a function of progress through the progress length of the video content;

obtain audio information defining audio content, the audio content captured during capture of the video content, the audio information characterizing one or more directions of sounds within the audio content;

identify an audio event within the audio content based on one or more of the sounds within the audio content, the one or more of the sounds including a particular term or a particular combination of terms or being of a particular intensity and/or a particular pattern, the audio event occurring at an audio event moment within the progress length, the one or more of the sounds originating from one or more audio sources captured within an audio event extent within the spherical video content at the audio event moment, wherein the audio event is associated with a temporal type and a spatial type, the temporal type providing guidance with respect to relative temporality of the highlight event with respect to the audio event and the spatial type providing guidance with respect to relative spatiality of the highlight event with respect to the audio event;

identify a highlight event moment of the highlight event based on the audio event moment and the temporal type of the audio event, the highlight event occurring at the highlight event moment within the progress length;

identify a highlight event extent of the highlight event based on the audio event extent and the spatial type of the audio event, the highlight event captured within the highlight event extent within the video content at the highlight event moment;

effectuate storage of the identification of the highlight event moment and the identification of the highlight event extent in a storage medium; and generate a video summary including a portion of the video content, the portion of the video content including the highlight event based on the highlight event moment and the highlight event extent.

20. The system of claim 19, wherein:

based on the spatial type providing that the highlight event occurs co-located with the audio event, the highlight event extent is identified to be the same as the audio event extent or is identified based on tracking an object within the audio event extent; and based on the spatial type providing that the highlight event does not occur co-located with the audio event, the highlight event extent is identified based on a relative location of the one or more audio sources with respect to an image capture device that captured the video content and:

one or more directions of the one or more of the sounds originating from the one or more audio sources;

a gaze analysis within the audio event extent; or a gesture analysis within the audio event extent.

* * * * *